(12) United States Patent
Winger

(10) Patent No.: US 7,212,573 B2
(45) Date of Patent: May 1, 2007

(54) METHOD AND/OR APPARATUS FOR DETERMINING MINIMUM POSITIVE REFERENCE INDICES FOR A DIRECT PREDICTION MODE

(75) Inventor: Lowell L. Winger, Waterloo (CA)

(73) Assignee: LSI Logic Corporation, Milpitas, CA (US)

( * ) Notice: Subject to any disclaimer, the term of this patent is extended or adjusted under 35 U.S.C. 154(b) by 888 days.

(21) Appl. No.: 10/461,780

(22) Filed: Jun. 13, 2003

(65) Prior Publication Data
US 2004/0252760 A1    Dec. 16, 2004

(51) Int. Cl.
*H04B 1/66* (2006.01)
(52) U.S. Cl. ............... 375/240.12; 375/240.16; 375/240.13; 375/240.15; 375/240.14; 375/240.24; 382/238; 382/236; 348/699
(58) Field of Classification Search .......... 375/240.12, 375/240.16, 240.13, 240.15, 240.14, 240.24; 382/238, 236; 348/699
See application file for complete search history.

(56) References Cited

U.S. PATENT DOCUMENTS

2006/0291557 A1\* 12/2006 Tourapis ............ 375/240.12

\* cited by examiner

*Primary Examiner*—Shawn S. An (74) *Attorney, Agent, or Firm*—Christopher P. Maiorana PC (57) ABSTRACT

An apparatus comprising a first processing circuit and a second processing circuit. The first processing circuit may be configured to generate (i) one or more prediction samples and (ii) a plurality of macroblocks, in response to each frame of an input video signal. The second processing circuit may be configured to (i) select one or more reference indices for each of the macroblocks from one or more sets of reference indices and (ii) generate said one or more prediction samples in response to said selected reference indices. Each of the selected reference indices is generally determined based upon minimum and maximum values for each of the one or more sets of reference indices.

17 Claims, 9 Drawing Sheets

METHOD AND/OR APPARATUS FOR DETERMINING MINIMUM POSITIVE REFERENCE INDICES FOR A DIRECT PREDICTION MODE

FIELD OF THE INVENTION

The present invention relates to processing digital video generally and, more particularly, to a method and/or apparatus for determining minimum positive reference indices for a direct prediction mode.

BACKGROUND OF THE INVENTION

Conventional methods for generating reference indices in the derivation process for temporal direct luma reference index prediction mode need at least three steps (clocks) when both inputs are negative. Processing logic needs to handle the multiple parameters when the parameters do not arrive at the same time. Common processing instructions would be available that are not reused to generate the reference indices given the calculation can be changed.

Existing approaches for determining a minimum positive reference index use the function:

MinPositive $(a,b)=\{a;$ if $((b<0)||((a>=0\&\&(a<=b))$ $\{b;$ if $((a<0)\&\&(b>=0))||((a>=0)\&\&(b>=0)\&\&$
$(a>b))$ With such an approach, the output is dependent on the order of the inputs. In particular, the output is asymmetric with respect to the inputs. The result is that on a sequential machine that uses one clock to execute each instruction (e.g., many CPUs), such an approach uses six instructions and therefore 6 cycles to execute:

$b<0$, compare

||, logical or $a>=0$, compare

It would be desirable to implement a processing method and/or apparatus that would reuse process steps to simplify processing.

SUMMARY OF THE INVENTION

The present invention concerns an apparatus comprising a first processing circuit and a second processing circuit. The first processing circuit may be configured to generate (i) one or more prediction samples and (ii) a plurality of macroblocks, in response to each frame of an input, video signal. The second processing circuit may be configured to (i) select one or more reference indices for each of said macroblocks from one or more sets of reference indices and (ii) generate said one or more prediction samples in response to the selected reference indices. Each of the selected reference indices is generally determined based upon minimum and maximum values for each of the one or more sets of reference indices.

The objects, features and advantages of the present invention include providing a method and/or architecture for processing digital video that may (i) reduce the complexity of the MinPositive function in the MPEG-AVC/H.264 video compression standard, (ii) maximize the re-use of common elements/instructions for implementation of the MPEG-AVC/H.264 video compression standard, and/or (iii) maximize the re-use of atomic instructions that are commonly used.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
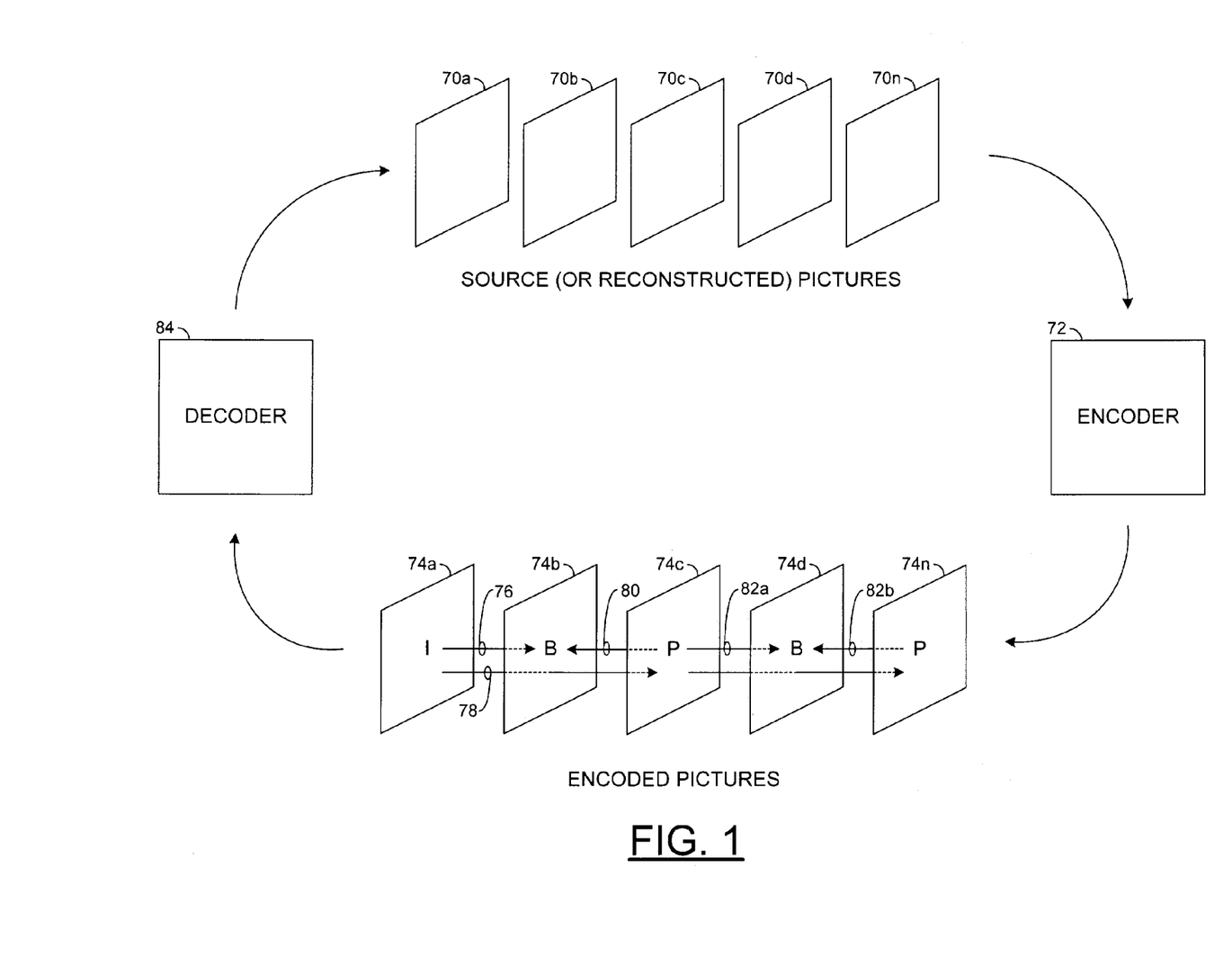
FIG. 1 is a block diagram illustrating encoding and decoding operations.

Referring to FIG. 1, a block diagram is shown illustrating encoding and decoding operations. In general, a data stream (e.g., a video stream) may comprise a series of source pictures 70a–n. The source pictures may also be referred to as images, frames, a group-of-pictures (GOP) or a sequence. The pictures generally comprise contiguous rectangular arrays of pixels (i.e., picture elements). Compression of digital video without significant quality degradation is usually possible because video sequences contain a high degree of: 1) spatial redundancy, due to the correlation between neighboring pixels, 2) spectral redundancy, due to correlation among the color components, 3) temporal redundancy, due to correlation between video frames, and 4) psychovisual redundancy, due to properties of the human visual system (HVS). Video frames generally comprise three rectangular matrices of pixel data representing a luminance signal (e.g., luma Y) and two chrominance signals (e.g., chroma Cb and Cr) that correspond to a decomposed representation of the three primary colors (e.g., Red, Green and Blue) associated with each picture element. The most common format used in video compression standards is eight bits and 4:2:0 sub-sampling (e.g., the two chroma components are reduced to one-half the vertical and horizontal resolution of the luma component). However, other formats may be implemented to meet the design criteria of a particular application.

Each picture may comprise a complete frame of video (e.g., a frame picture) or one of two interlaced fields from an interlaced source (e.g., a field picture). The field picture generally does not have any blank lines between the active lines of pixels. For example, if the field picture is viewed on a normal display, the field picture would appear short and fat. For interlaced sequences, the two fields may be encoded together as a frame picture. Alternatively, the two fields may be encoded separately as two field pictures. Both frame pictures and field pictures may be used together in a single interlaced sequence. High detail and limited motion generally favors frame picture encoding. In general, field pictures occur in pairs (e.g., top/bottom, odd/even, field1/field2). The output of a decoding process for an interlaced sequence is generally a series of reconstructed fields. For progressive scanned sequences, all pictures in the sequence are frame pictures. The output of a decoding process for a progressive sequence is generally a series of reconstructed frames.

The source pictures 70*a–n* may be presented to an encoder 72. The encoder 72 may be configured to generate a series of encoded pictures 74*a–n* in response to the source pictures 70*a–n,* respectively. For example, the encoder 72 may be configured to generate the encoded pictures 74*a–n* using a compression standard (e.g., MPEG-2, MPEG-4, H264, etc.). In general, encoded pictures may be classified as intra coded pictures (I), predicted pictures (P) and bi-predictive pictures (B). Intra coded pictures are generally coded without temporal prediction. Rather, intra coded pictures use spatial prediction within the same picture. For example, an intra coded picture is generally coded using information within the corresponding source picture (e.g., compression using spatial redundancy). An intra coded picture is generally used to provide a receiver with a starting point or reference for prediction. In one example, intra coded pictures may be used after a channel change and to recover from errors.

Predicted pictures (e.g., P-pictures or P-frames) and bi-predictive pictures (e.g., B-pictures or B-frames) may be referred to as inter coded. Inter coding techniques are generally applied for motion estimation and/or motion compensation (e.g., compression using temporal redundancy). P-pictures and B-pictures may be coded with forward prediction from references comprising previous I and P pictures. For example, the B-picture 76*b* and the P-picture 74*c* may be predicted using the I-picture 74*a* (e.g., as indicated by the arrows 76 and 78, respectively). The B-pictures may also be coded with (i) backward prediction from a next I or P-reference picture (e.g., the arrow 80) or (ii) interpolated prediction from both past and future I or P-references (e.g., the arrows 82*a* and 82*b,* respectively). However, portions of P and B-pictures may also be intra coded or skipped (e.g., not sent at all). When a portion of a picture is skipped, the decoder generally uses the associated reference picture to reconstruct the skipped portion with no error.

However, the concept of what particular pictures may reference what other particular pictures may be generalized in a particular compression standard (e.g., H.264). For example, P-pictures may reference temporally forward or backward. B-pictures may have similar forward or backward references. The restriction is not time, but rather how many frames are stored in a buffer so the frames can be decoded in a different order than the frames are displayed. In one example, the frames may be referenced forward in time. In another example, the frames may be referenced backward in time (e.g., re-ordering the frames).

In one example, a B-frame may differ from a P-frame in that a B-frame may do interpolated prediction from any two reference frames. Both reference frames may be (i) forward in time, (ii) backward in time, or (iii) one in each direction. B-pictures can be, and are expected to often be, used as prediction references in H.264. In many cases an important distinction is between reference and non-reference frames.

The encoded pictures 74*a–n* may be presented to a decoder 84. The decoder 84 is generally configured to generate a series of reconstructed pictures corresponding to the source pictures 70*a*–70*n* (e.g., images, frames, fields, etc.) in response to the encoded pictures. In one example, the decoder 84 may be implemented within the encoder 72 and the reconstructed pictures may be used in the prediction operations.

Figure 2:
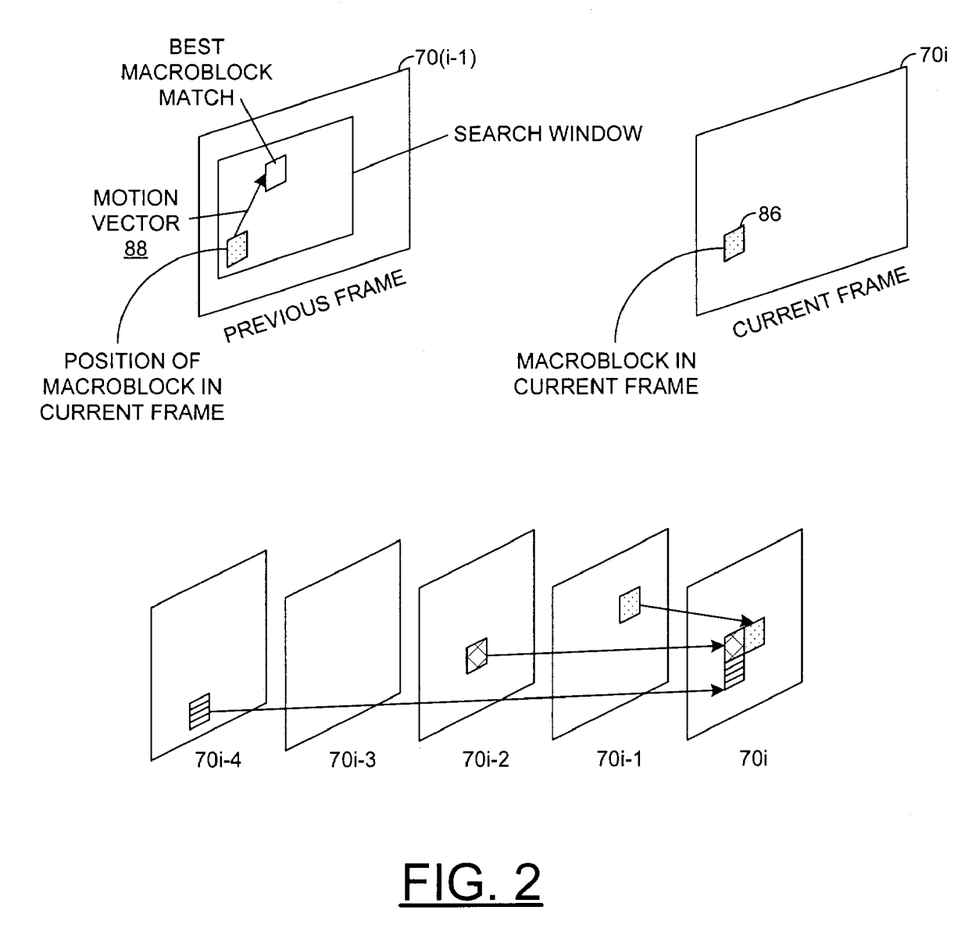
FIG. 2 is a block diagram illustrating example prediction operations.

Referring to FIG. 2, a block diagram is shown illustrating example prediction operations. A picture (or video frame) 70*i* may be divided into a number of macroblocks 86 of equal size. In one example, the macroblocks 86 may be implemented as 16 ×16 pixels. However, other size macroblocks may be implemented to meet the design criteria of a particular application. Motion compensated prediction generally presumes that a macroblock within the current picture 70*i* may be modeled as a translation of a macroblock from a previous picture 70(*i–l*). Each macroblock 86 in the current picture 70*i* is generally predicted from the previous picture 70(*i–l*). The motion information is generally represented as a two-dimensional displacement vector or motion vector 88. Due to the block-based picture representation, motion estimation generally uses block-matching techniques that obtain the motion vector by minimizing a cost function measuring the mismatch between a candidate block and the current block. In one example, a number of previous (or reference) pictures may be used to predict the macroblocks in the current picture.

Figure 3:
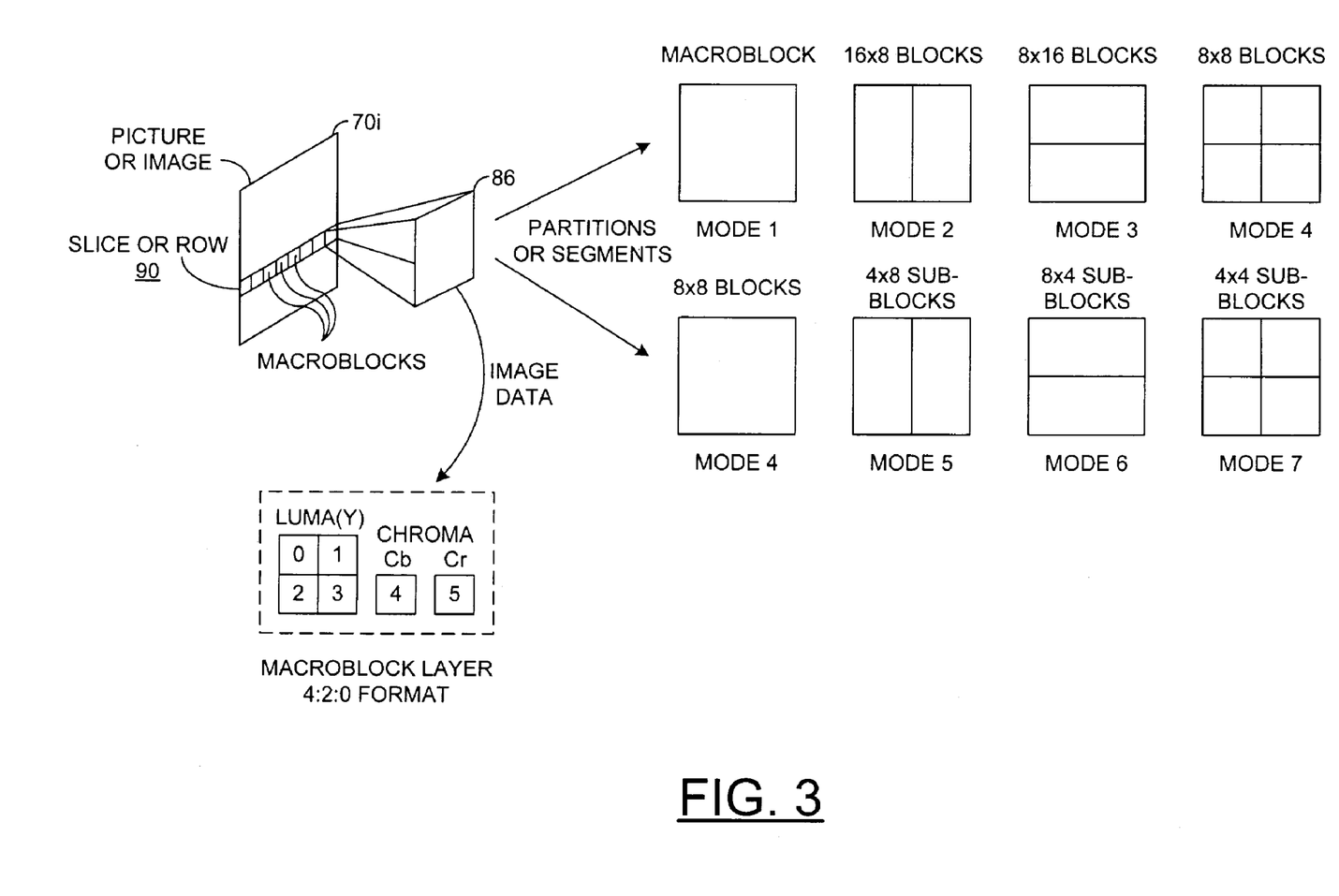
FIG. 3 is a block diagram illustrating partitions or segments of pictures.

Referring to FIG. 3, a block diagram is shown generally illustrating partitions or segments of pictures. In general, a picture (e.g., an image, a frame, a field, etc.) 70*i* may be divided (e.g., segmented, partitioned, etc.) into a number of macroblocks 86. The macroblocks generally comprise an array of pixels having vertical and horizontal dimensions of equal size (e.g., 32×32, 16 ×16, etc). The macroblocks generally comprise luminance data (e.g., luma or Y) and chrominance data (e.g., chroma Cb and Cr). In one example, the luminance data may have a resolution that is twice that of the chrominance data (e.g., a 4:2:0 format).

The macroblocks 86 may be grouped in a number of slices 90. The slices 90 may comprise an arbitrary number of macroblocks 86. The slices 90 generally run from left to right and may comprise an entire row of the picture 70*i*. However, a slice 90 may comprise less than or more than an entire row of macroblocks 86 (e.g., H.264 compliant). In one example, a slice 90 may be defined as a particular number of macroblocks 86 grouped together. For broadcast profiles, the macroblocks 86 in a slice 90 are generally consecutive macroblocks in raster scan order. However, for streaming and/or video-conferencing applications, a map may be sent identifying which scattered macroblocks are grouped together in a slice. A compression standard (e.g., H.264) may also provide an option of using macroblocks or macroblock pairs. A macroblock pair comprises two macroblocks located one above the other. When macroblock pairs are used, a slice or row generally comprises macroblock pairs rather than macroblocks.

In one example, the macroblock 86 may be implemented as a 16×16 block. Each 16×16 macroblock 86 may be predicted with a single 16×16 vector (e.g., mode 1). Alternatively, the macroblock 86 may be segmented into two 16×8 blocks (e.g., mode 2) or two 8×16 blocks (e.g., mode 3), in which case two motion vectors may be generated for predicting the macroblock 86. The macroblock 86 may also be segmented into four 8×8 blocks (e.g., mode 4), in which case four motion vectors may be generated for the macroblock 86. When the macroblock 86 is segmented into the four 8×8 blocks (e.g., mode 4), each 8×8 block may be optionally further segmented into two 4×8 sub-blocks (e.g., mode 5), two 8 ×4 sub-blocks (e.g., mode 6) or four 4×4 sub-blocks (e.g., mode 7). An encoder generally decides which "mode" to use for encoding each macroblock 86. For example, an error score may be computed based on a closeness of match determination for each mode, with the modes that use more vectors being penalized (e.g., by increasing the respective error score) because of the additional bits that it will take to encode the motion vectors.

Figure 4:
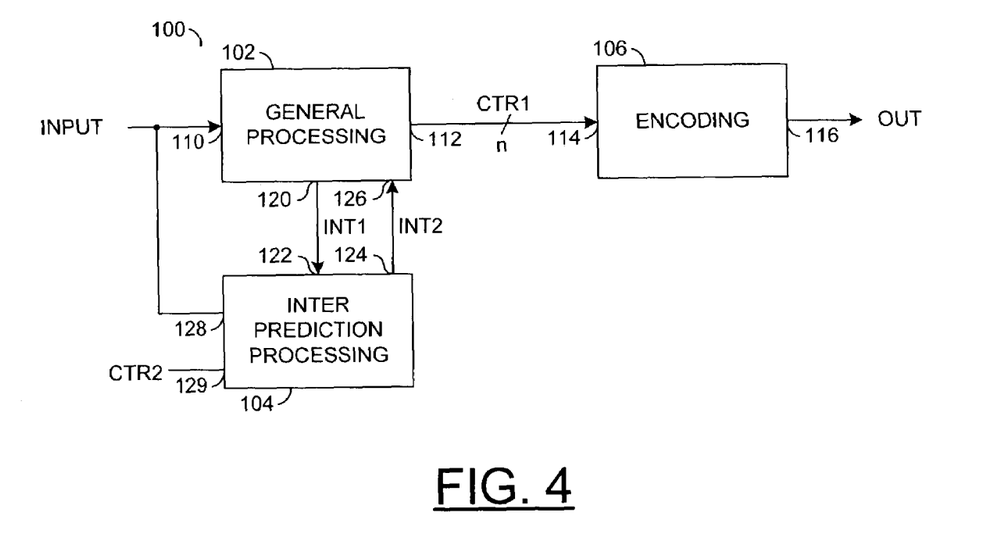
FIG. 4 is a block diagram of a preferred embodiment of the present invention.

Referring to FIG. 4, a block diagram illustrating a system 100 in accordance with the preferred embodiment of the present invention is shown. The system 100 may be implemented as part of an H.264 compliant encoder. The system 100 generally comprises a processing block 102 and a processing block 104. The system 100 may also comprise an encoding block 106. The processing block 102 may be implemented as a general processing block. The processing block 104 may be implemented as an inter prediction processing block.

The general processing block 102 may have an input 110 that may receive an input video signal (e.g., INPUT). The signal INPUT generally comprises a digital video input signal comprising a series of pictures (e.g., frames, fields, etc.). Each picture generally comprises a representation of a digital video signal at a particular time. The general processing block 102 may be configured to generate a plurality of macroblocks from each picture. The general processing block 102 may also have an output 112 that may present one or more control signals (e.g., CTR1) to an input 114 of the encoding circuit 106.

The encoding circuit 106 may have an output 116 that may present a signal (e.g., OUT). The signal OUT may be an encoded bitstream, such as a digital video bitstream. The general processing circuit 102 may have an output 120 that may present one or more signals (e.g., INT1) to an input 122 of the inter prediction processing block 104. Similarly, the inter prediction processing block 104 may have an output 124 that may present a signal (e.g., INT2) to an input 126 of the general processing block 102. The signal INT2 generally comprises one or more prediction samples related to each picture.

The inter prediction processing block 104 may have an input 128 that may receive the signal INPUT and an input 129 that may receive one or more control signals (e.g., CTR2). The control signal CTR2 may comprise, in one example, information for processing the macroblocks of the signal INPUT. For example, the signals CTR2 may indicate macroblock types, sizes, addresses and other parameters for each macroblock. In one example, the signal CTR2 may control the inter prediction processing block 104 to decode both P and B type macroblocks. The inter prediction processing block 104 may also provide inter prediction motion compensation and/or inter prediction processing.

Figure 5:
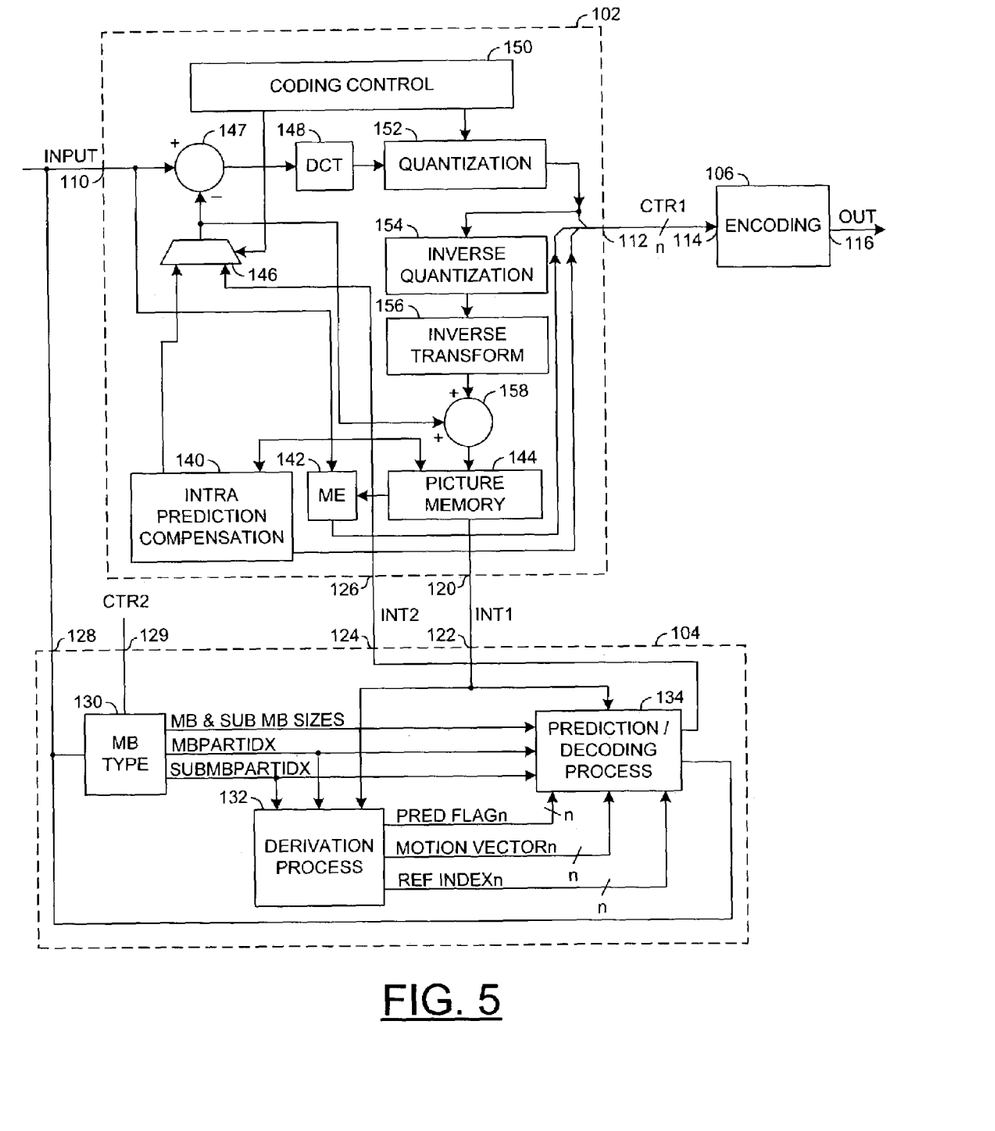
FIG. 5 is a more detailed diagram of the present invention.

Referring to FIG. 5, a more detailed diagram of the system 100 is shown. The inter prediction processing block 104 generally comprises a block (or circuit) 130, a block (or circuit) 132 and a block (or circuit) 134. The circuit 130 may be implemented as a macroblock classification circuit. The circuit 132 may be implemented as a derivation circuit. The circuit 134 may be implemented as a prediction/decoding circuit. The circuit 130 may be configured to determine a particular macroblock type in response to the signal CTR2. In particular, the circuit 130 may determine if a particular macroblock in the signal INPUT is a P-type macroblock or a B-type macroblock. The circuit 130 may also define one or more macroblock partitions, and/or define one or more submacroblock partitions.

The block 130 may receive the macroblocks from the input 128. The block 130 generally generates a number of parameters such as macroblock and submacroblock sizes (e.g., MB and SUBMBSIZES), macroblock partition index information (e.g., MBPARTIDX), and submacroblock partition index information (e.g., SUBMBPARTIDX). The macroblock and submacroblock size information may be presented to the block 134. The macroblock partition index information and submacroblock partition index information may be presented to both the block 132 and the block 134. The signal INT1 may be presented to both the block 132 and the block 134. The block 132 may generate one or more prediction flags (e.g., PREDFLAGn), one or more motion vector signals (e.g., MOTIONVECTORn) and one or more reference index signals (e.g., REFINDEXn) to the block 134. The block 134 may be implemented to generate the signal INT2 in response to the signals INT1 and INPUT, the signals received from the block 130 and the signals received from the block 132.

The circuit 102 generally comprises a block (or circuit) 140, a block (or circuit) 142, a block (or circuit) 144, a block (or circuit) 146, a block (or circuit) 147, a block (or circuit) 148, a block (or circuit) 150, a block (or circuit) 152, a block (or circuit) 154, a block (or circuit) 156 and a block (or circuit) 158. The circuit 140 may be implemented as an intra prediction and compensation circuit. The circuit 142 may be implemented as a motion estimation circuit. The circuit 144 may be implemented as a picture memory circuit. The circuit 146 may be implemented as a selection circuit, such as a 2:1 multiplexer. The circuit 147 may be implemented as a summing circuit. The circuit 148 may be implemented as a transform circuit. In one example, the circuit 148 may be configured to perform an integer transform operation or a transform (DCT). The circuit 150 may be implemented as a control circuit. The circuit 152 may be implemented as a quantization circuit. The circuit 154 may be implemented as an inverse quantization circuit. The circuit 156 may be implemented as an inverse transform circuit. The circuit 158 may be implemented as a summing circuit.

An output of the quantization circuit 152, an output of the motion estimation circuit 142 and an output of the intra prediction and compensation circuit 140 may be presented as the signal CTR1 at the output 112. The inverse quantization circuit 154 may be used to reverse the quantization process previously performed by the quantization circuit 152. The inverse transform circuit 156 generally reverses the transformation process (e.g., DCT or integer) that was performed by the circuit 148, transferring the data set from a frequency domain to the spatial domain. The inverse transform circuit may also be referred to as an inverse DCT block or an IDCT block.

The signal INPUT may be presented to the motion estimation block 142 and the summing block 147. The summing block 147 may mathematically combine the signal INPUT with either (i) the output of the intra prediction and compensation block 140 or (ii) the output of the block 104. The selection may respond to a signal provided by the control circuit 150. The signal INPUT may be compressed with the DCT circuit 148. The DCT circuit 148 may translate the macroblocks in the signal INPUT from time domain frames to frequency domain frames. The quantization block 152 may reduce the number of bits in a number of coefficients used to encode the signal INPUT. The encoding block 106 may provide entropy coding to implement a lossless compression having frequent values represented in fewer bits.

The inverse quantization circuit 154 and the inverse transform circuit 156 may be used to reconstruct the macroblocks. The summing block 158 may provide a mathematical operation to contribute the predicted macroblock. By reconstructing the macroblocks, the processing block 102 ensures that the prediction processing is based upon the same reference as would be available during decoding. Within the inter motion compensation block, the inter prediction process may have a macroblock type block, a derivation process block and a decoding process block. The derivation block 132 may generate one or more reference indices.

Figure 6:
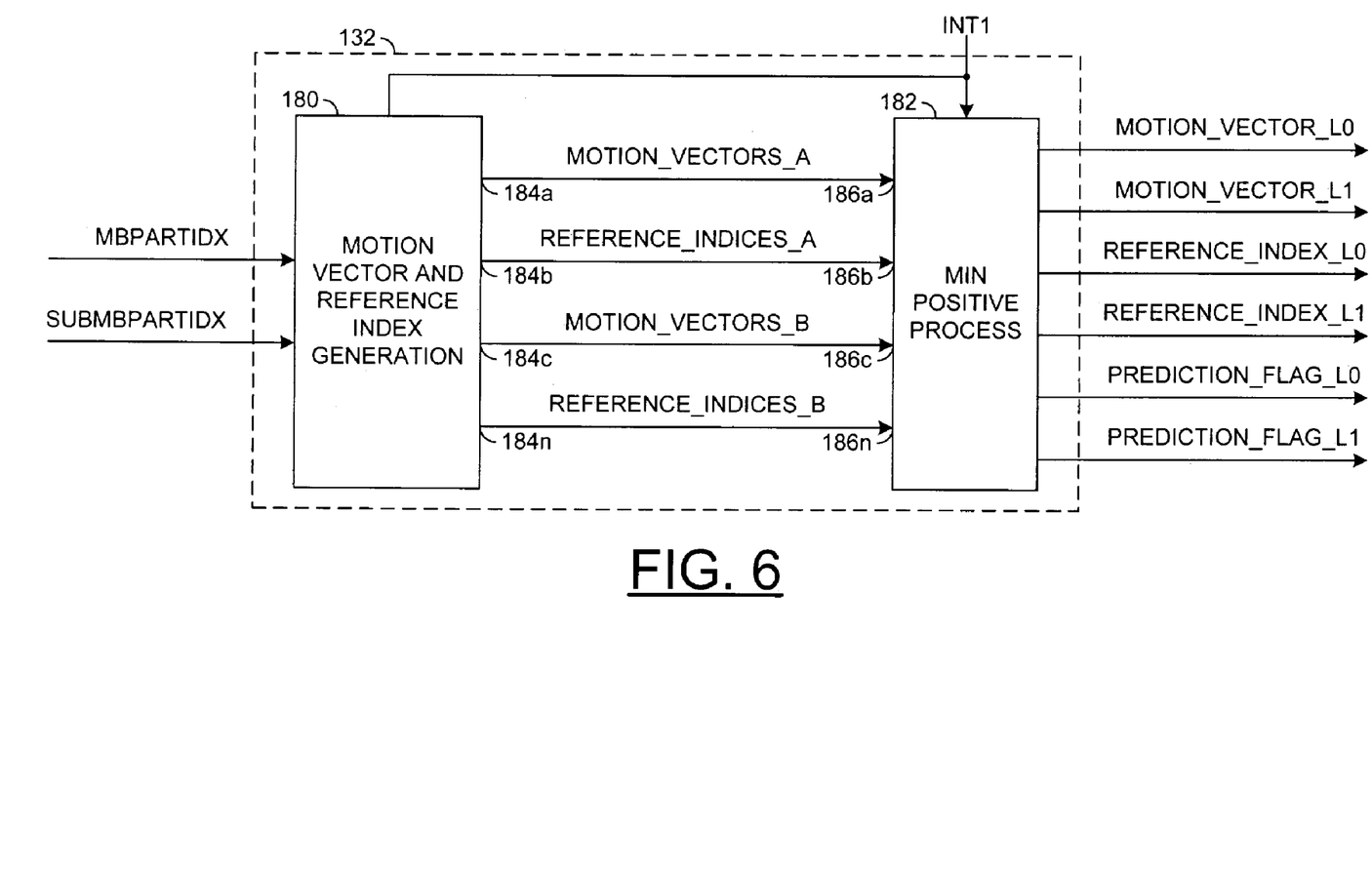
FIG. 6 is a more detailed diagram of the derivation process block of FIG. 2.

Referring to FIG. 6, a more detailed diagram of the derivation block 132 is shown. The derivation block 132 generally comprises a block (or circuit) 180 and a block (or circuit) 182. The block 180 may be a motion vector and reference index generation circuit. The block 182 may be implemented as a positive process block. The circuit 180 may have a number of outputs 184a–184n that may present a number of signals to a number of inputs 186a–186n of the circuit 182. The output 184a may present a signal (e.g., MOTION_VECTORS_A), the output 184b may present a signal (e.g., REFERENCE_INDICES_A), the output 184c may present a signal (e.g., MOTION_VECTORS_B), and the output 184n may present a signal (e.g., REFERENCE_INDICES_B). The circuit 182 is shown presenting the signal MOTION_VECTORn as a motion vector signal (e.g., MOTION_VECTOR_L0) and a signal (e.g., MOTION_VECTOR_L1). The signal REFINDEXn may be presented as a reference index signal (e.g., REFERENCE_INDEX_L0) and a signal (e.g., REFERENCE_INDEX_L1). The signal PREDFLAGn may be presented as a flag signal (e.g., PREDICTION_FLAG_L0) and a flag signal (e.g., PREDICTION_FLAG_L1).

The derivation circuit 132 is shown generating outputs for a submacroblock (e.g., an 8×8 portion of a 16×16 macroblock. Since four submacroblocks generally make up a macroblock, the derivation circuit 132 may be implemented to process each of the four submacroblocks separately. Additionally, in some cases only one submacroblock may need to be processed. In one example, the signals REFERENCE_INDICES_A and REFERENCE_INDICES_B may comprise one or more values that do not index a valid list. The circuit 182 may be configured to present the signals REFERENCE_INDEX_L0 and REFERENCE_INDEX_L1 having a predetermined value (e.g., −1) that indicates a lack of reference into a valid reference picture list.

Figure 7:
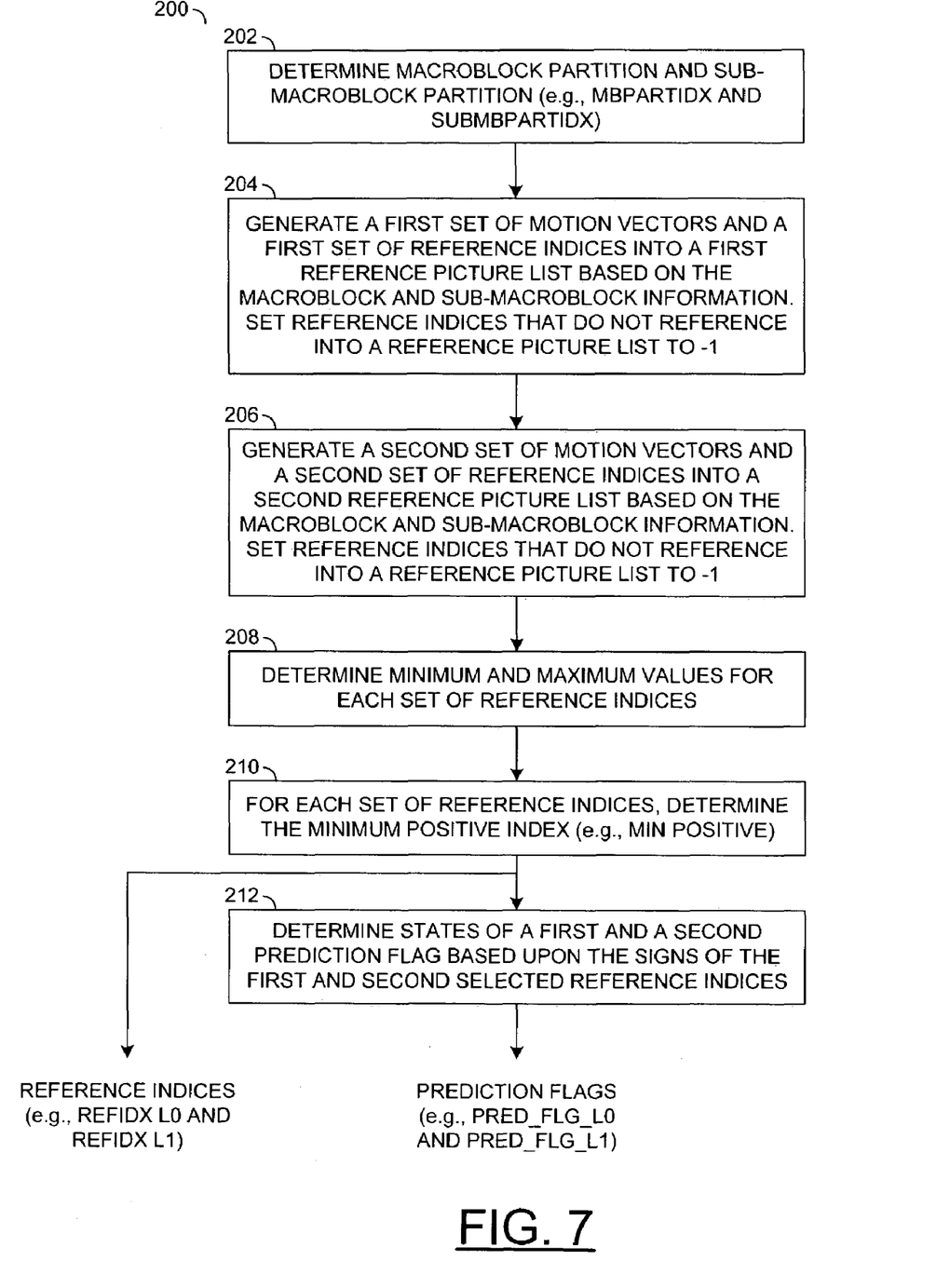
FIG. 7 is a diagram illustrating a process flow of the present invention.

Referring to FIG. 7, a diagram illustrating a process flow (or method) 200 of the present invention is shown. The method generally comprises a state 202, a state 204, a state 206, a state 208, a state 210 and a state 212. The state 202 generally determines a macroblock partition and submacroblock partition. The first set of reference indices into a first reference picture list based on the macroblock and submacroblock information. Depending on previously coded macroblocks, the generated indices may be set to −1, indicating that the indices do not reference into a reference picture list. The state 206 may generate a second set of motion vectors and a second set of reference indices into a second reference picture list based on the macroblock and submacroblock information. Depending on previously coded macroblocks, the generated indices may be set to −1, indicating that the indices do not reference into a reference picture list.

If adjacent (macro)blocks 'A' or 'B' either aren't available (are outside the picture for example) or use intra prediction, then their 'reference index variable value' is generally set to −1. In such a case, the MINPOSITIVE process generally returns a positive value as long as either A or B are non-negative (i.e., are a real index into a list of reference pictures). For example, the MINPOSITIVE process uses max(a,b) when both 'a' and 'b' are not positive (rather than min(a,b) which is used when they are both positive). The state 208 generally determines a maximum and minimum value for each set of reference indices. The state 210 generally determines the minimum positive index for each set of reference indices. The state 212 generally determines the states of a first and a second prediction applied based upon the signs of the first and second selected reference indices.

Figure 8:
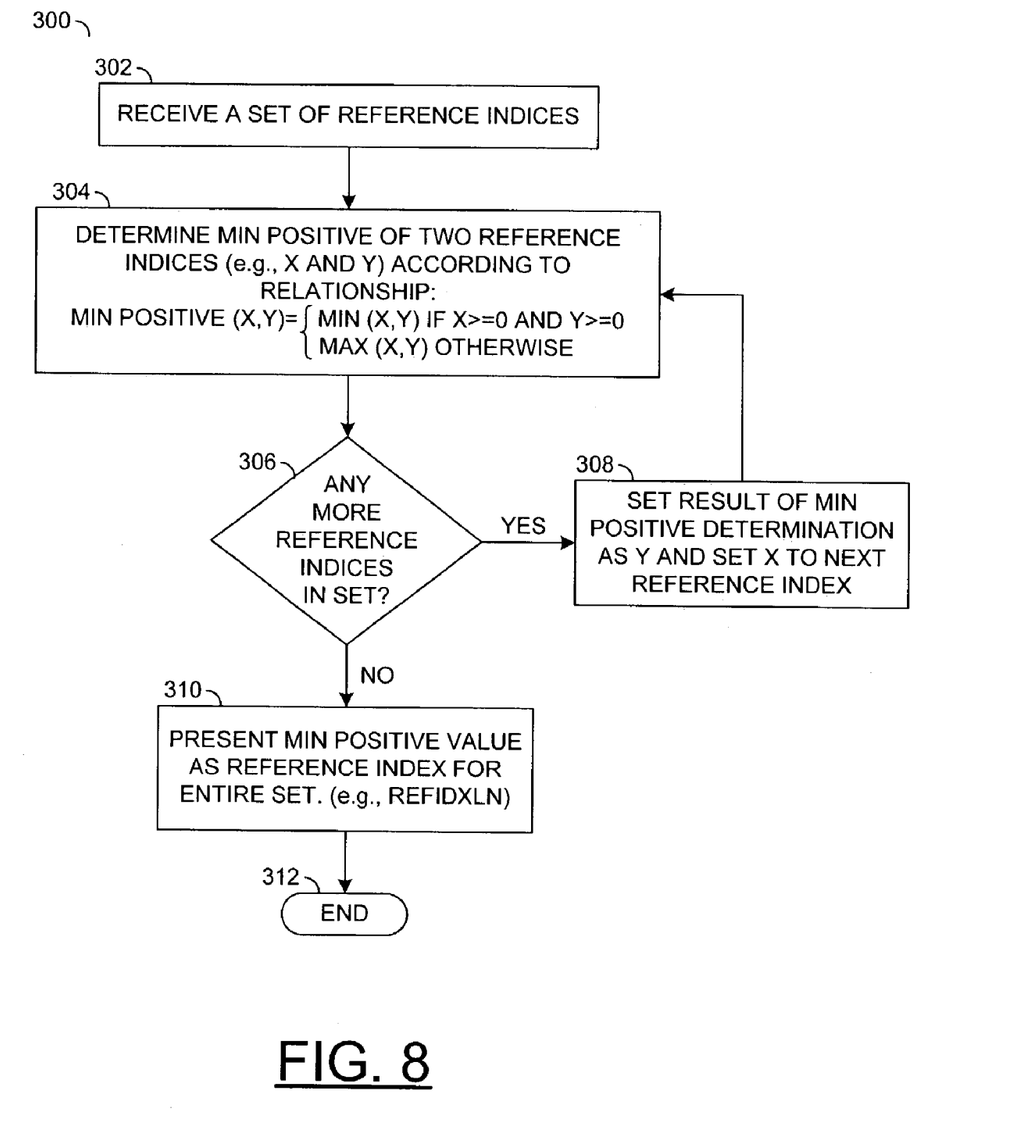
FIG. 8 is a diagram illustrating generation of reference indices in accordance with the present invention.

Referring to FIG. 8, a block diagram of a method (or process) 300 illustrating the generation of reference indices is shown. The method 300 generally comprises a state 302, a state 304, a decision state 306, a state 308, a state 310 and a state 312. The state 302 generally receives a set of reference indices. The state 304 generally determines a minimum positive of the two reference indices according to a predefined relationship. The state 306 generally determines if any more reference indices are set. If so, the method moves to the state 308. If not, the method moves to the state 310. The state 308 sets the result of the minimum positive determination as a value Y and sets a value X to the next reference index. The state 310 generally presents a minimum positive value as a reference index for the entire set. The state 312 generally ends the method.

The present invention may use the following function:

$$\text{MinPositive}(x,y) = \{\min(x,y), \text{ if } x>=0 \text{ and } y>=0$$

$$\max(x,y), \text{ otherwise}$$

The present invention generally sets the behavior of the MinPositive instruction when both inputs are positive. The output is independent of the order of the inputs, rather (i) the minimum of the inputs is always presented in the case when both inputs are positive and (ii) the maximum of the inputs is presented when one or both of the inputs is negative. The output is now symmetric with respect to the inputs. The result is that the order of the inputs does not need to be taken into account during the computation of the function.

On a sequential machine that uses one clock to execute each instruction (e.g., many CPUs), and that has a MIN-MAX instruction that places the minimum and the maximum of two inputs into specific outputs, and that has a BOTHPOSITIVE instruction that evaluates the commonly encountered computation 'if x>=0 and y>=0'.

Figure 9:
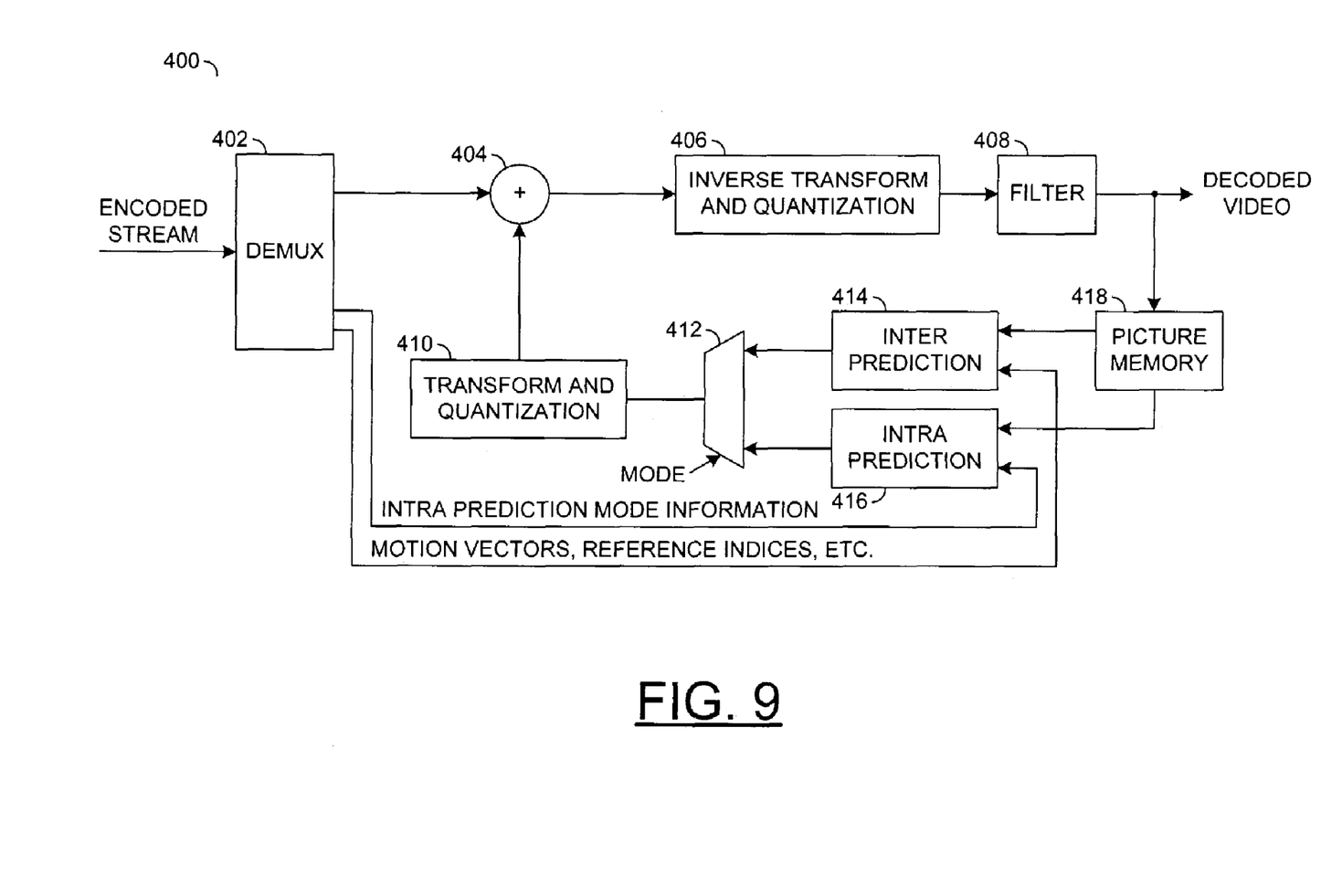
FIG. 9 is a diagram illustrating a decode process in accordance with the present invention.

Referring to FIG. 9, an example of a system 400 is shown implementing a decode process in accordance with a preferred embodiment of the present invention. The system 400 generally comprises a block (or circuit) 402, a block (or circuit) 404, a block (or circuit) 406, a block (or circuit) 408, a block (or circuit) 410, a block (or circuit) 412, a block (or circuit) 414, a block (or circuit) 416 and a block (or circuit) 418. The circuit 412 may be implemented as a demultiplexer circuit. The circuit 404 may be implemented as a summing circuit. The circuit 406 may be implemented as an inverse transform and quantization circuit. The circuit 408 may be implemented as a filter circuit. The circuit 410 may be implemented as a transform and quantization circuit. The circuit 412 may be implemented as a multiplexer circuit. The circuit 414 may be implemented as an inter prediction circuit. The circuit 416 may be implemented as an intra prediction circuit. The circuit 418 may be implemented as a picture memory circuit. In general, the process described in accordance with the present invention may be implemented in the picture memory circuit 418 and the intra prediction 414.

The present invention has a number of advantages. First, the potential for lower complexity implementation may be realized. Second, symmetry (e.g., the independence on the order of the inputs) may be provided. The result is generally dependent only on the relative values of the inputs, and not on which input has which value. Third, re-use of the min( ) and max( ) functions, which are used by many other processes in the H.264 standard may permit sharing of a common resource (e.g., an optimized max or min function) for multiple purposes (e.g., in complying with subclauses 7.4.3, 8.2.1, 8.2.2.4, 8.3.3.1, 9.3.2.3, 9.3.3.1.3, A.3.1, C.1.1 of JVT-G050d35) (also the median( ) function which makes use of min( ) and max( ) in subclause 8.4.1.3.1, which is invoked for multiple uses throughout the standard). Fourth, the re-use of a MINMAX instruction that places the minimum and maximum of two inputs into specific outputs. Fifth, the re-use of a BOTHPOSITIVE instruction that tests if both inputs are positive or not. Sixth, the complete elimination of special case logic that does not use instructions with a high potential for re-use, increasing the potential for sharing of optimized resources with other processes used not only for implementing the invention, but also for the rest of the processes that execute on a particular resource for the complex applications and devices that typically use video codecs as only one of the processes that are supported.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first processing circuit configured to generate (i) one or more prediction samples and (ii) a plurality of macroblocks in response to each frame of an input video signal;
a second processing circuit configured (i) to select one or more reference indices for each of said macroblocks from one or more sets of reference indices and (ii) to generate said one or more prediction samples in response to said selected reference indices, wherein each of said selected reference indices is determined based upon minimum and maximum values for each of said one or more sets of reference indices.

2. The apparatus according to claim 1, wherein said first circuit is further configured to generate transformed and quantized data in response to said plurality of macroblocks and said one or more prediction samples.

3. The apparatus according to claim 2, further comprising:
an encoding circuit configured to generate an encoded bitstream in response to said transformed and quantized data.

4. The apparatus according to claim 1, wherein each of said macroblocks is segmented into one or more sub-macroblocks.

5. The apparatus according to claim 1, wherein said reference indices are selected using an operand equation that presents the maximum of a first and a second input when both inputs are negative.

6. The apparatus according to claim 1, wherein said operand equation processes one of said macroblocks on each cycle of a clock.

7. The apparatus according to claim 6, wherein said macroblocks comprise B-frame macroblocks.

8. The apparatus according to claim 1, wherein said processing circuit comprises a first mode configured to process temporal direct luma references.

9. The apparatus according to claim 8, wherein said first mode comprises an inter prediction mode.

10. A method for processing a digital video signal comprising the steps of:
(A) generating a plurality of macroblocks for each frame of said digital video signal;
(B) calculating a set of one or more reference indices for each of said macroblocks, wherein each of said one or more reference indices is calculated using an operand equation configured to present a minimum value of a first input and second input when both of said first and second inputs are positive and a maximum value of said first and second input when either or both of said first input and said second input are not positive; and
(C) generating one or more prediction samples for a current macroblock in response to said set of indices for said current macroblock.

11. The method according to claim 10, wherein said method is further configured to generate transformed and quantized data in response to said plurality of macroblocks and said one or more prediction samples.

12. The method according to claim 11, further comprising the step of:
generating an encoded bitstream in response to said transformed and quantized data.

13. The method according to claim 11, wherein each of said macroblocks is segmented into one or more sub-macroblocks.

14. The method according to claim 11, wherein said reference indices are selected using an operand equation that presents the maximum of a first and a second input when both inputs are negative.

15. The method according to claim 11, wherein said operand equation processes one of said macroblocks on each cycle of a clock.

16. An apparatus comprising:
a first processing circuit configured to decode a bitstream in response to (i) one or more prediction samples and (ii) a plurality of macroblocks in response to each frame of an input video signal;
a second processing circuit configured (i) to select one or more reference indices for each of said macroblocks from one or more sets of reference indices and (ii) to generate said one or more prediction samples in response to said selected reference indices, wherein each of said selected reference indices is determined based upon minimum and maximum values for each of said one or more sets of reference indices.

17. The apparatus according to claim 16, further comprising:
a generator circuit configured to generate said one or more sets of reference indices in response to (i) a macroblock partition parameter and (ii) a submacroblock partition parameter; and
a control circuit configured to generate said macroblock partition parameter in response to said plurality of macroblocks and one or more control signals.

* * * * *